United States Patent
Damola

(10) Patent No.: US 11,223,500 B2
(45) Date of Patent: Jan. 11, 2022

(54) TRAFFIC ACCELERATION IN MOBILE NETWORK

(71) Applicant: Telefonaktiebolaget L M Ericsson (publ), Stockholm (SE)

(72) Inventor: Ayodele Damola, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 360 days.

(21) Appl. No.: 14/976,349

(22) Filed: Dec. 21, 2015

(65) Prior Publication Data

US 2016/0112217 A1 Apr. 21, 2016

Related U.S. Application Data

(63) Continuation of application No. 12/943,248, filed on Nov. 10, 2010, now Pat. No. 9,246,712, which is a
(Continued)

(51) Int. Cl.
*H04L 12/66* (2006.01)
*H04L 12/46* (2006.01)
(Continued)

(52) U.S. Cl.
CPC .......... *H04L 12/66* (2013.01); *H04L 12/4633* (2013.01); *H04L 61/2007* (2013.01); *H04L 61/1511* (2013.01); *H04L 67/28* (2013.01)

(58) Field of Classification Search
CPC combination set(s) only.
See application file for complete search history.

(56) References Cited

U.S. PATENT DOCUMENTS

| | | |
|---|---|---|
| 6,108,703 A | 8/2000 | Leighton et al. |
| 7,660,296 B2 | 2/2010 | Fletcher et al. |

(Continued)

FOREIGN PATENT DOCUMENTS

| | | |
|---|---|---|
| WO | 2007/104031 A2 | 9/2007 |
| WO | 2010/125761 A1 | 4/2010 |
| WO | 2010/106390 A1 | 9/2010 |

OTHER PUBLICATIONS

Written Opinion of the International Searching Authority dated Jun. 29, 2011 and issued in corresponding International Application No. PCT/SE2010/051218.
(Continued)

*Primary Examiner* — Yemane Mesfin
*Assistant Examiner* — Mon Cheri S Davenport
(74) *Attorney, Agent, or Firm* — Patent Portfolio Builders PLLC

(57) ABSTRACT

A method for enabling traffic acceleration in a mobile telecommunication network. The method includes the steps of receiving, at a Radio Network Node, a reply message from a content delivery provider located outside the mobile telecommunication network; intercepting the reply message; extracting a token from the reply message; comparing the token with a stored token in the Radio Network Node; replacing in the reply message, an Internet protocol IP address of a content delivery provider server with a preset IP address corresponding to an acceleration edge server in the mobile network, when there is a match between the token and the stored token; and sending from the Radio Network Node the modified reply message to a mobile terminal.

12 Claims, 6 Drawing Sheets

Related U.S. Application Data continuation of application No. PCT/SE2010/051218, filed on Nov. 8, 2010.

(51) Int. Cl.
*H04L 29/12* (2006.01)
*H04L 29/08* (2006.01)

(56) References Cited

U.S. PATENT DOCUMENTS

| | | |
|---|---|---|
| 8,543,107 B1 | 9/2013 | Bertz et al. |
| 8,675,490 B2 | 3/2014 | Ukita et al. |
| 2003/0016636 A1 | 1/2003 | Tari et al. |
| 2003/0225900 A1 | 12/2003 | Morishige et al. |
| 2006/0020684 A1 | 1/2006 | Mukherjee et al. |
| 2007/0094411 A1 | 4/2007 | Mullane et al. |
| 2007/0153782 A1* | 7/2007 | Fletcher ............. H04J 3/1617 370/389 |
| 2007/0154016 A1 | 7/2007 | Nakhjiri et al. |
| 2008/0205326 A1* | 8/2008 | Caradec ............. H04W 40/02 370/328 |
| 2011/0153807 A1 | 6/2011 | Vicisano et al. |
| 2013/0336221 A1 | 12/2013 | Damola et al. |

OTHER PUBLICATIONS

International Search Report dated Jun. 29, 2011 and issued in corresponding International Application No. PCT/SE2010/051218.
First Office Action issued in corresponding Chinese patent application No. 201080070039.0 dated Jul. 3, 2015.
First Search Report issued in corresponding Chinese patent application No. 201080070039.0 dated Apr. 20, 2015.
Akamai; "Beyond Caching: The User Experience Impact of Accelerating Dynamic Site Elements Across the Internet" White Paper; Nov. 2008.
Rodriguez, Pablo et al., "Session Level Techniques for Improving Web Browsing Performance on Wireless Links," 2004 Proceedings of the World Wide Web, May 17-22, 2004, New York, NY, USA, ACM 1-58113-844-X.
Clara Serrano et al.; "Latency in Broad-band Mobile Networks; 3G Radio Product"; Vodafone Group Networks; Madrid Spain; Apr. 2009.
Extended European Search Report and Supplemental European Search Report in corresponding European Application No. EP 10 85 9469 dated Aug. 11, 2016. (Reference D5 was submitted with an Information Disclosure Statement on Dec. 21, 2015.).
P. Srisuresh, et al.; "DNS extensions to Network Address Translators (DNS_ALG)"; NAT Networking Group, Internet-Draft; XP015024044, Jun. 1, 1999; pp. 1-24.
P. Rodriguez, et al.; "Session Level Techniques for Improving Web Browsing Performance on Wireless Links"; ACM XP040180034; May 17, 2015; pp. 121-130; New York.

\* cited by examiner

TRAFFIC ACCELERATION IN MOBILE NETWORK

RELATED APPLICATION

The application is a continuation of U.S. application Ser. No. 12/943,248, filed on Nov. 10, 2010, which is related to, and claims priority from, International Application No. PCT/SE2010/051218, filed on Nov. 8, 2010, the entire disclosure of which is incorporated here by reference.

TECHNICAL FIELD

The present invention generally relates to systems and methods and, more particularly, to mechanism and techniques for enabling traffic acceleration in a mobile telecommunication network.

BACKGROUND

Companies are rapidly adding dynamic, rich and interactive capabilities to improve user experiences, grow online audiences, and drive page views and transactions. As Web sites evolve toward completely rich, dynamic online channel experiences, businesses face a new, but stark challenge: this dynamic content cannot be cached and takes longer to load in a Web page. Today's consumers and businesspeople have come to expect highly personal and interactive online experiences. Whether they are making a purchase, booking a reservation or watching a movie, they demand a smooth, flawless experience and they will not hesitate to click to another site when their expectations go unmet. Sluggish site performance and slower page downloads can diminish the user experience and increase site abandonment. The result is lower customer loyalty and revenue.

Content Distribution Network CDN providers Internet are currently offering traffic acceleration services to address the issue of Quality of Experience QoE for Internet based services from regular browsing to e-commerce. An example of an acceleration offering is the EdgePlatform [see: Beyond Caching; The User Experience Impact of Accelerating Dynamic Site Elements across the Internet, 2008]. The EdgePlatform provides the insight into Internet traffic patterns and is the dynamic site acceleration platform for three critical technologies used to carry site content requests from the customer's browser to the company's origin data center and back—in an instant.

The below mentioned three technologies compensate for the inadequacies of BGP, TCP and HTTP protocol and effectively create a new Internet platform for today's dynamic online businesses.

SureRoute for Performance
Transport Protocol Optimization
Prefetching

Traffic acceleration is based on a set of components. These include; Domain Name Server DNS system with global mapping function, a set of distributed acceleration servers and a Service level Agreement SLA between a Content Distribution Network CDN provider and portal provider (web application provider). The SLA also means a set of configurations on the portal provider's DNS server.

The following steps summarize the acceleration process:

1. CDN provider's dynamic mapping system directs user requests for application content to an optimal acceleration server.

2. Route optimization technology identifies the fastest and most reliable path back to the origin infrastructure to retrieve dynamic application content.

3. A high-performance transport protocol transparently optimizes communications between the acceleration server and the origin, improving performance and reliability.

4. The acceleration server retrieves the requested application content and returns it to the user over secure optimized connections.

The first step requires a good knowledge of the proximity between the clients and the acceleration servers and constitutes the topic of the invention that will be described later in this application. The detailed description of the acceleration process of the system targeted in this invention is shown and described in the U.S. Pat. No. 7,660,296.

FIG. 1 belongs to prior art and discloses a system comprising an Internet Service Provider ISP network, an Internet network 5 and an operator's mobile network 6. The system is an overlay mechanism that operates by receiving IP packets at one set of servers, tunneling these packets through a series of servers, and delivering them to a fixed, defined IP address. Edge servers 13, 17 can be seen in the ISP network and in the Internet network. An origin edge server 13 is responsible for receiving, encapsulating and forwarding IP packets. A User edge server 17 is responsible for receiving, encapsulating and/or decapsulating and forwarding IP packets. The ISP comprises a target server 14 that is a machine whose traffic is to be tunneled through the overlay mechanism. The Internet network comprises a CDN provider DNS 3 that is responsible for selecting an appropriate user edge server to receive and forward IP traffic. The CDN provider DNS 3, origin edge server 13 and the User edge server 17 are parts of a CDN provider infrastructure 95, also called content delivery provider. The term "content delivery provider" refers to those services that at least distribute (provide) the existing content to the users (e.g. Akamai, YouTube). Thus, a content delivery provider may not generate the content (Akamai) or may generate the content (YouTube) in addition to delivering the content. A signaling point XYZ DNS 18 represents a portal provider's DNS. The operator's mobile network comprises a local DNS 16. The local DNS receives queries from a user for URL addresses for content delivery providers. The operator's mobile network further comprises a Gateway GPRS Support Node GGSN 11 and a Radio Network Controller RNC1 2. A user equipment or user terminal 1 is in radio connection with RNC1 2 in FIG. 1. Some of the entities in FIG. 1 will be explained more in detail together with FIG. 3 when the invention is explained later in this application.

FIG. 2 discloses a signal sequence diagram of a method according to prior art to find a suitable acceleration edge server and direct IP packets to/from the server via an acceleration tunnel. Signaling points 1,16,11,18,3,17,13 and 14 included in FIG. 2 have been explained together with FIG. 1. The method according to prior art comprises the following steps:

A browser in the user equipment 1 sends 61 a DNS request for an URL (Uniform Resource Locator) of a provider portal. The purpose with the DNS request is to find out what IP address corresponds to a certain URL domain name in order to find a Web server that stores information that is of interest for the user. The local DNS server 16 of the operator receives the request and initiates a set of recursive DNS lookups.

The local DNS 16 queries the portal provider's DNS, i.e. the query is sent 62 from the local DNS 16 to the XYZ DNS 18. The portal provider is in this example named "XYZ". The portal provider is a customer of the CDN operator and has the name server configured to return a pointer to the DNS server of the CDN provider according to the DNS redirection principle described in the U.S. Pat. No. 6,108,703.

An URL pointing at the CDN provider portal is returned 63.

The local DNS sends 64 a request to CDN provider DNS. According to the mapping mechanism described in the U.S. Pat. No. 7,660,296 the CDN operator selects a user edge server also called Edge region or called ES-User. The selection procedure is described in U.S. Pat. No. 7,660,296. The selection is based on either the IP address of the user terminal 1 or the IP address of the local DNS server 16 from which the DNS request originated. The selected server in this example is the user edge server 17 in the Internet network. From the perspective of the mobile network the selected server will be suboptimal as it would reside outside the mobile network.

A content delivery provider redirect message (also called a name resolution reply message) is sent 65, 66 from the CDN provider DNS 3 via the local DNS 16 towards the user terminal 1. The IP address of the selected server 17 is hereby returned. The IP address is called the Virtual IP VIP.

IP packets destined towards the selected server 17 are sent 67 from the terminal 1.

A tunnel is created from the CDN providers User edge server 17 towards the origin edge server 13. The user packets are accelerated within the tunnel by mechanisms of the CDN provider. The portal provider server 14, i.e. the target server, gets the packets 68 and sends back a reply (web pages). Packets 69 from the portal provider server 14 are accelerated within the tunnel back to the selected server 17.

The terminal 1 receives 70 the packets.

The CDN providers understand that in a few years Internet will be mostly accessed via mobile broadband rather than via fixed broadband. For this reason they will like to be able to offer their services to their customers (content delivery providers) in mobile networks, i.e. be able to perform acceleration of traffic for terminals connected to mobile networks. Currently, the furthest deployment of traffic acceleration servers in the mobile networks that the CDN providers can offer is at the Gateway GRPS Support Node GGSN level. However due to latencies existing below the GGSN [see: Latency in Broad-band Mobile Networks, C Serrano el at., Vodafone Group Networks], the CDN providers will like to be able to go deeper into the mobile network.

Deploying the accelerators at a Radio Network Node RNN (like a Radio Network Controller RNC in 3G networks or an eNodeB in Long-Term Evolution LTE networks) enables operators to be even closer to the end users, this way they can provide improved QoE (Quality of Experience) to end users and thereby create a new offering to their customers the content delivery providers. The main problem of deploying accelerator nodes below GGSN is that a problem of selecting the best user edge server arises. If a plurality of user edge servers are collocated with a plurality of RNNs (i.e. RNCs or eNodeBs), there currently is no direct logical association between the RNN and an attached terminal to enable the mapping function of CDN provider DNS to associate an RNN based user edge server with the terminal. The problem is further compounded by the fact that the IP address of the terminal which could be used to enable the mapping function to find a suitable user edge server is not visible to the mapping function as the GGSN is the IP anchor point for all mobile terminals. The selection of a suitable user edge server based on the ISP DNS server will also not work as it does not give enough granularity. Furthermore, there are 3GPP tunnels which run from the GGSN (or PDN-Gateway within the EPC Evolved Packet Core) to the RNN and from the RNN to the terminal and special operations must be done to enable the CDN provider acceleration mechanism to be able to accelerate traffic at the RNN level.

SUMMARY

An aim of the invention is to overcome the above-identified limitations of the prior art. The disclosed subject matter focuses on the introduction of a function inside a Radio Network Node RNN, e.g., a Radio Network Controller or an evolved Node B, which is able to aid in selecting an RNN based user edge server for the purpose of accelerating traffic between a terminal associated with that RNN and a portal provider's server. The function is situated in the signalling path between the terminal and a Content Distribution Network CDN provider Domain Name Server DNS. The function intercepts and modifies a DNS reply in such a way that the terminal sends the packets which are meant to be accelerated, to the RNN based user edge server instead of to a server node selected by the CDN provider. In addition, the function also takes care of forwarding traffic to the right mobile specific tunnels between the RNN and the terminal and between the RNN and a Gateway GPRS Support Node GGSN.

The solution in one exemplified embodiment is a method for enabling traffic acceleration in a mobile telecommunication network. The method includes the following steps:

A name resolution reply message from a content delivery provider located outside the mobile telecommunication network is received at a Radio Network Node.

The reply message is intercepted.

A token from the reply message is extracted.

The token is compared with a stored token in the Radio Network Controller.

Replacing in the reply message, an Internet protocol IP address of a content delivery provider server with a preset IP address corresponding to an acceleration edge server in the mobile network when there is a match between the token and the stored token.

The modified reply message is sent from the Radio Network Node to a mobile terminal.

The solution in another exemplified embodiment is a Radio Network Node RNN for enabling traffic acceleration in a mobile telecommunication network. The Radio Network Node is configured to transfer a name resolution reply message from a content delivery provider outside the mobile communication network to a mobile terminal connected to the mobile telecommunication network. The Radio Network Node includes:

An interface configured to receive the reply message.

Circuitry connected to the interface and configured to extract a token from the reply message, wherein the token was introduced into the reply message by the content delivery provider, wherein the circuitry is configured to intercept the reply message when arriving from the content delivery provider, compare the token with a stored token, and replace in the reply message an Internet protocol IP address of a content delivery provider server with a preset IP address corresponding to an acceleration edge server in the mobile network, when there is a match between the token and the stored token; and An interface configured to send to the mobile terminal the modified reply message with the preset IP address instead of the content delivery provider IP address.

In yet another exemplified embodiment is described a Radio Network Node RNN in a mobile telecommunication network. The Radio Network Node is configured to transfer a name resolution reply message from a content delivery provider outside the mobile telecommunication network to a mobile terminal connected to the mobile telecommunication network. The Radio Network Node includes:

An interface configured to receive the reply message;

A routine configured to run on a processor to intercept the reply message when arriving from the content delivery provider, extract a token from the reply message, compare the token with a stored token, and replace in the reply message an Internet protocol IP address of a content delivery provider server with a preset IP address corresponding to an acceleration edge server in the mobile network, when there is a match between the token and the stored token.

The interface is configured to send to the mobile terminal the modified reply message with the preset IP address instead of the content delivery provider IP address.

An object of the invention is to improve Quality of Experience to end users.

Some advantages of the invention are as follows:

CDN providers are able to extend their business offering towards mobile networks and hence lead to more revenue.

Operators and network equipment vendors could get a share if the new revenue from the CDN operators as they will have to take an active role in deploying and implementing the new acceleration functions.

With the increase of Quality of Experience QoE, the operators will bring down customer churn and hence improve their revenue.

The Network vendors will be able to sell more boxes with traffic acceleration features.

The solution enables the operators to completely 'hide' their network topology from 3rd parties (CDN providers)

The solution has minimum impact on current design and functionality of access and core nodes.

The network operators will be able to save costs on traffic transfer over the backhaul and Internet peering costs as content would be served from the cache at the edge of The Radio Access Network rather than from the origin server in the Internet.

The subject matter will now be described more in detail with the aid of preferred embodiments in connection with the enclosed drawings.

BRIEF DESCRIPTION OF THE DRAWINGS

FIG. 3b discloses a block schematic illustration of Radio Network Nodes in an operator's mobile network of LTE type collocated with the ISP network and the Internet network in FIG. 3a.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 3A:
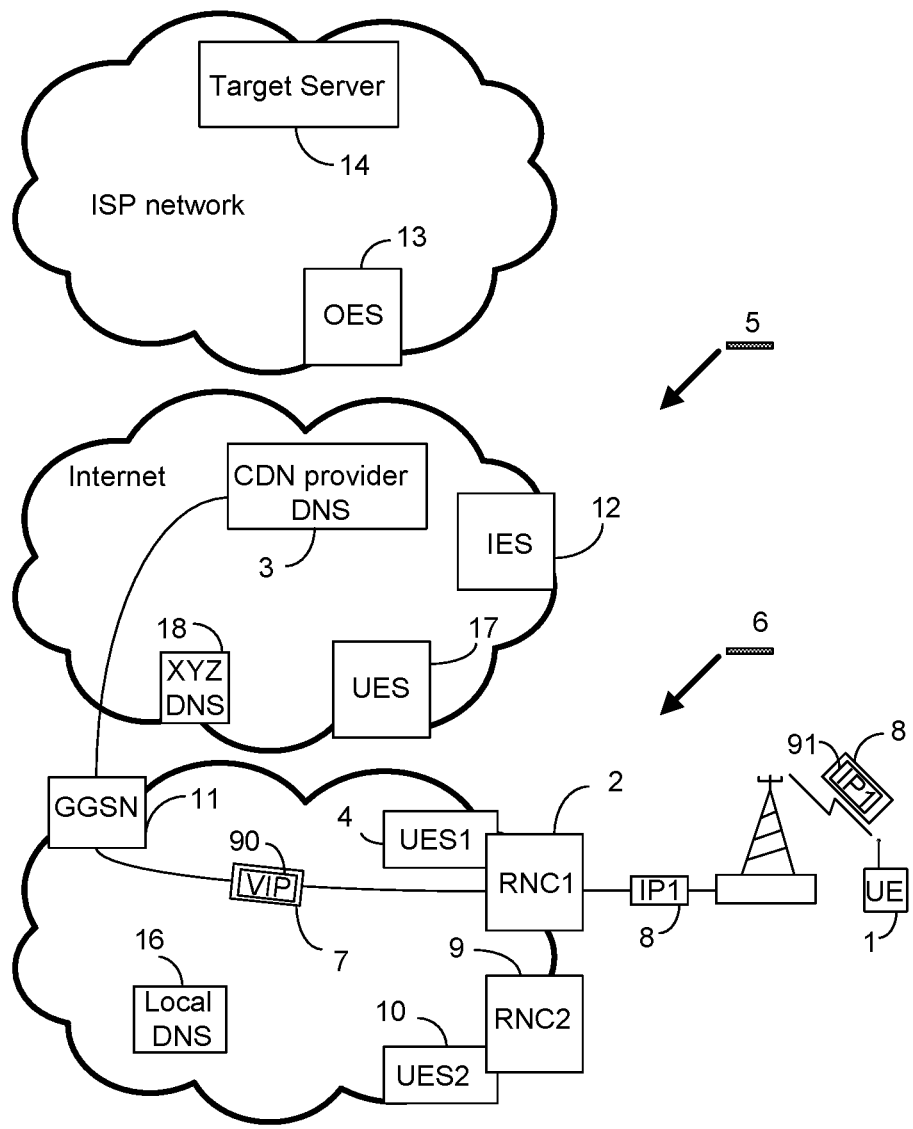
FIG. 3a discloses a block schematic illustration of a target server in an Internet Service Provider ISP network, a CDN provider DNS located in an Internet network and user edge servers collocated with Radio Network Nodes in an operator's mobile network of 3G type.
Figure 3B:
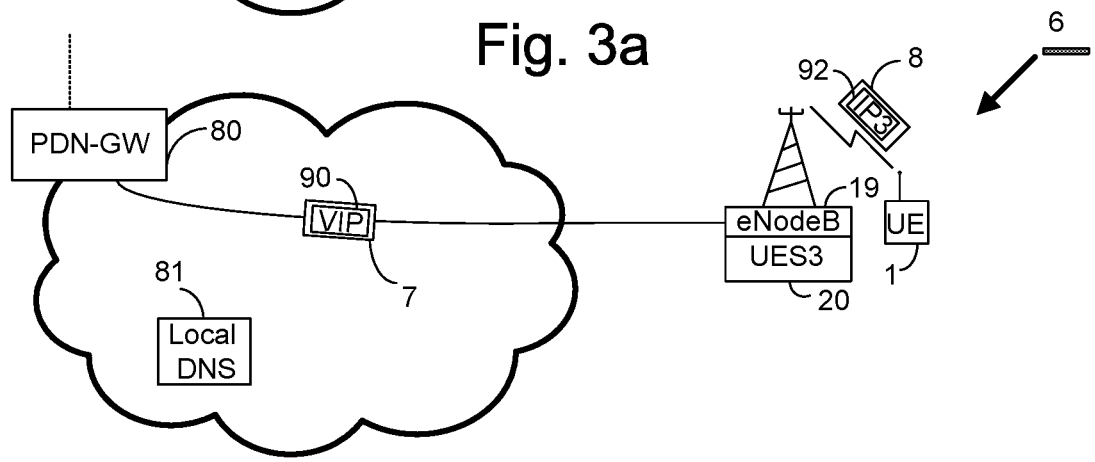

FIG. 3a discloses a system comprising an Internet Service Provider ISP network, an Internet network 5 and an operator's mobile network 6. The system is an overlay mechanism that operates by receiving IP packets at one set of servers, tunneling these packets through a series of servers, and delivering them to a fixed, defined IP address. Edge servers 4,10,12,13,17 of various kinds are located in the networks. An edge server is a server that resides on the "edge" between two networks, typically a private network and the Internet. Edge servers can serve different purposes depending on the context of the functionality in question, for example an origin edge server 13 like the one in the ISP network is responsible for receiving, encapsulating and forwarding IP packets. User edge servers 4, 10, 17, 20 like the ones in Internet and mobile networks in FIGS. 3a and 3b are responsible for receiving, encapsulating and/or decapsulating and forwarding IP packets. An intermediate edge server 12 like the one in the Internet network in FIG. 3a is a server that receives encapsulated packets from an edge region or other intermediate servers and forwards them on to other intermediate servers or to a gateway region. The ISP comprises a target server 14 that is a machine whose traffic is to be tunneled through the overlay mechanism. The Internet network comprises a CDN provider DNS 3 that is responsible for selecting an appropriate user edge server to receive and forward IP traffic. The operator's mobile network comprises a local DNS 16. The local DNS receives queries from a user for domain name resolution for content delivery providers. URL (Uniform Resource Locator) is a standard way of specifying the location of an object, typically a web page, on the Internet, the URL typically consists of a domain name followed by reference to the object. The operator's mobile network further comprises the already mentioned GGSN 11, a first Radio Network Controller RNC1 2 and a second Radio Network Controller RNC2 9. A Radio Network Controller RNC is the main element in a Radio Network system that controls the use and the reliability of the radio resources. A user edge server 4 and 10 is attached to each RNC in FIG. 3a. As said, these entities are responsible for receiving, encapsulating and/or decapsulating and forwarding IP packets. A user equipment or user terminal 1 is in radio connection with a base station connected to the RNC1. The base station is responsible for radio resource management.

FIG. 3b discloses parts of a Long-Term Evolution LTE system. The user equipment 1 is in radio connection with an evolved Node B eNodeB 19 that is attached to a PDN-Gateway 80 that is the access gateway towards the Internet network (indicated with a dotted line). The eNodeB provides the LTE air interface and performs radio resource management for the evolved access system. A user edge server UES3 20 is attached to the eNodeB. The operator's mobile network comprises a local DNS 81. The local DNS receives queries from a user for URL addresses for content delivery providers. The eNodeB and UES3 will be further discussed when a second embodiment of the invention is explained later in this application.

In FIG. 3a a Virtual IP packet VIP 90 is transported in a name resolution reply message 7 between the CDN provider DNS and RNC1 2 and a preset IP packet IP1 91 is in a first embodiment of the invention transported in a modified name resolution reply message 8 between RNC1 2 and the terminal 1. The transportation of the reply message will be further explained together with FIG. 4. In FIG. 3b a Virtual IP packet VIP 90 is transported in a name resolution reply message 7 between the CDN provider DNS and eNodeB 19 and a preset IP packet IP3 92 is in a second embodiment of the invention transported in a modified name resolution reply message 8 between eNodeB 19 and the terminal 1. The transportation of the reply message will be further explained when the second embodiment is discussed.

Figure 1:
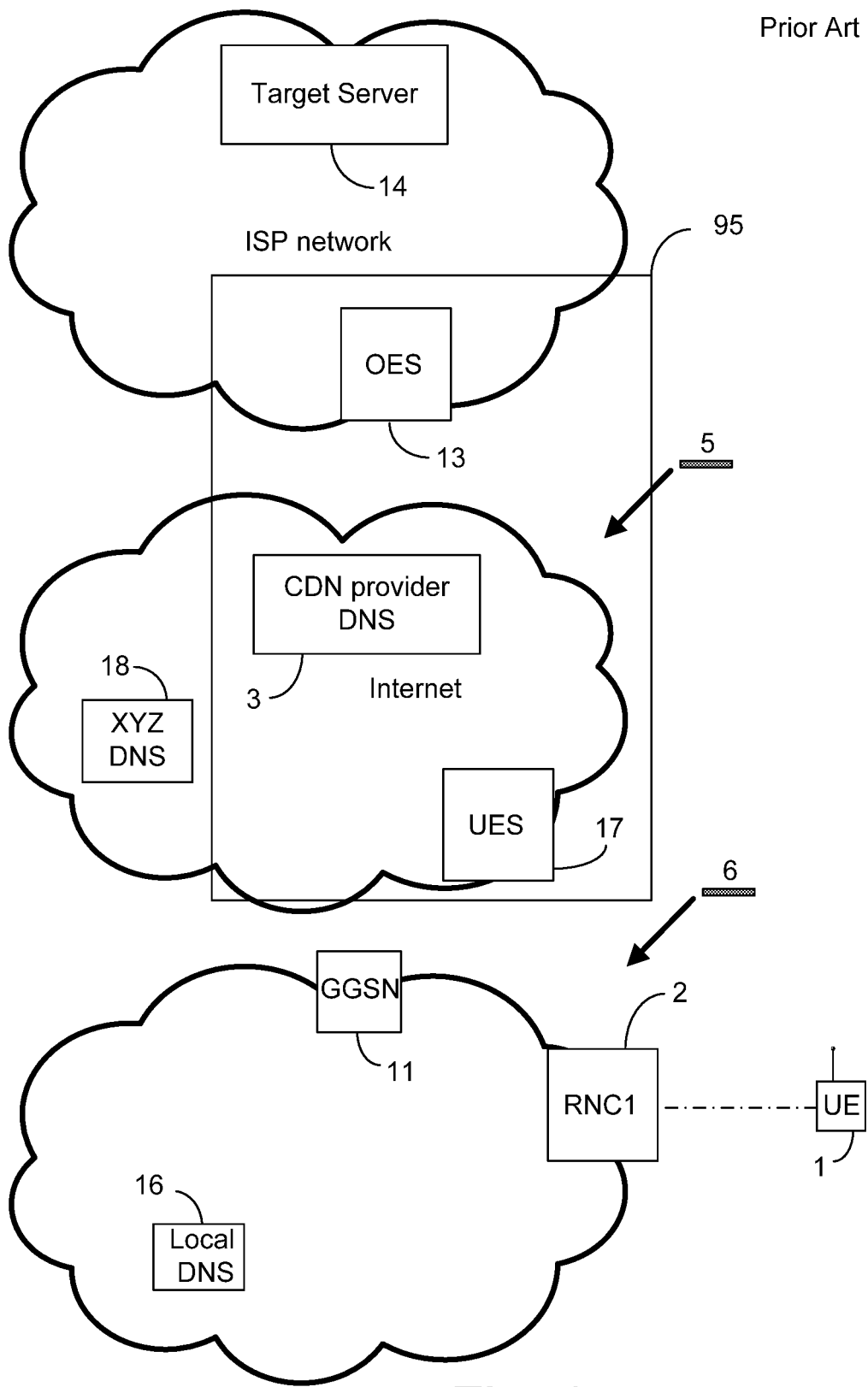
FIG. 1 is part of the prior art and discloses a block schematic illustration of a target server in an Internet Service Provider ISP network, a CDN provider DNS located in an Internet network and an operator's mobile network.
Figure 2:
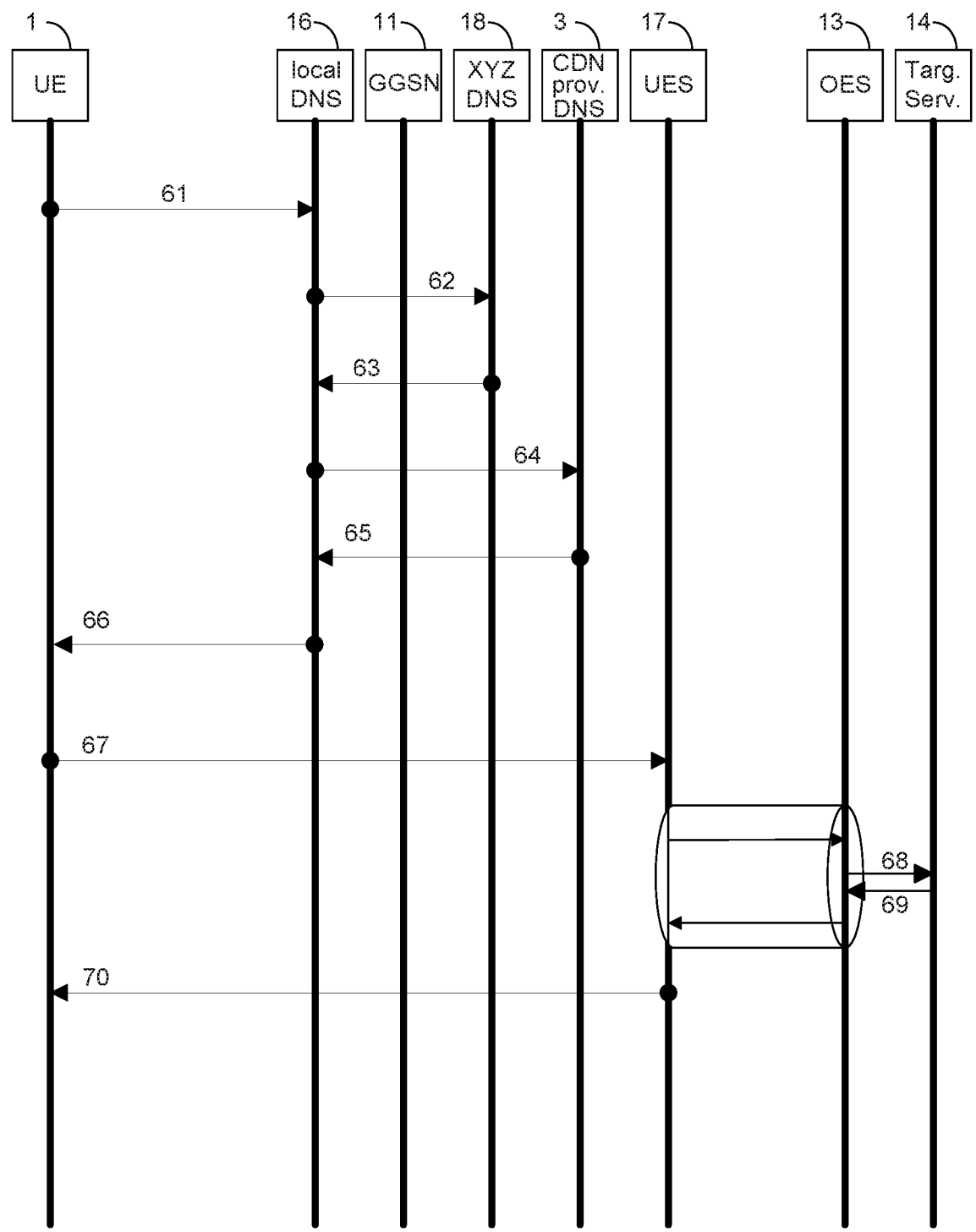
FIG. 2 is part of the prior art and discloses a signal sequence diagram of a method to find a suitable acceleration edge server in the fixed network.
Figure 4:
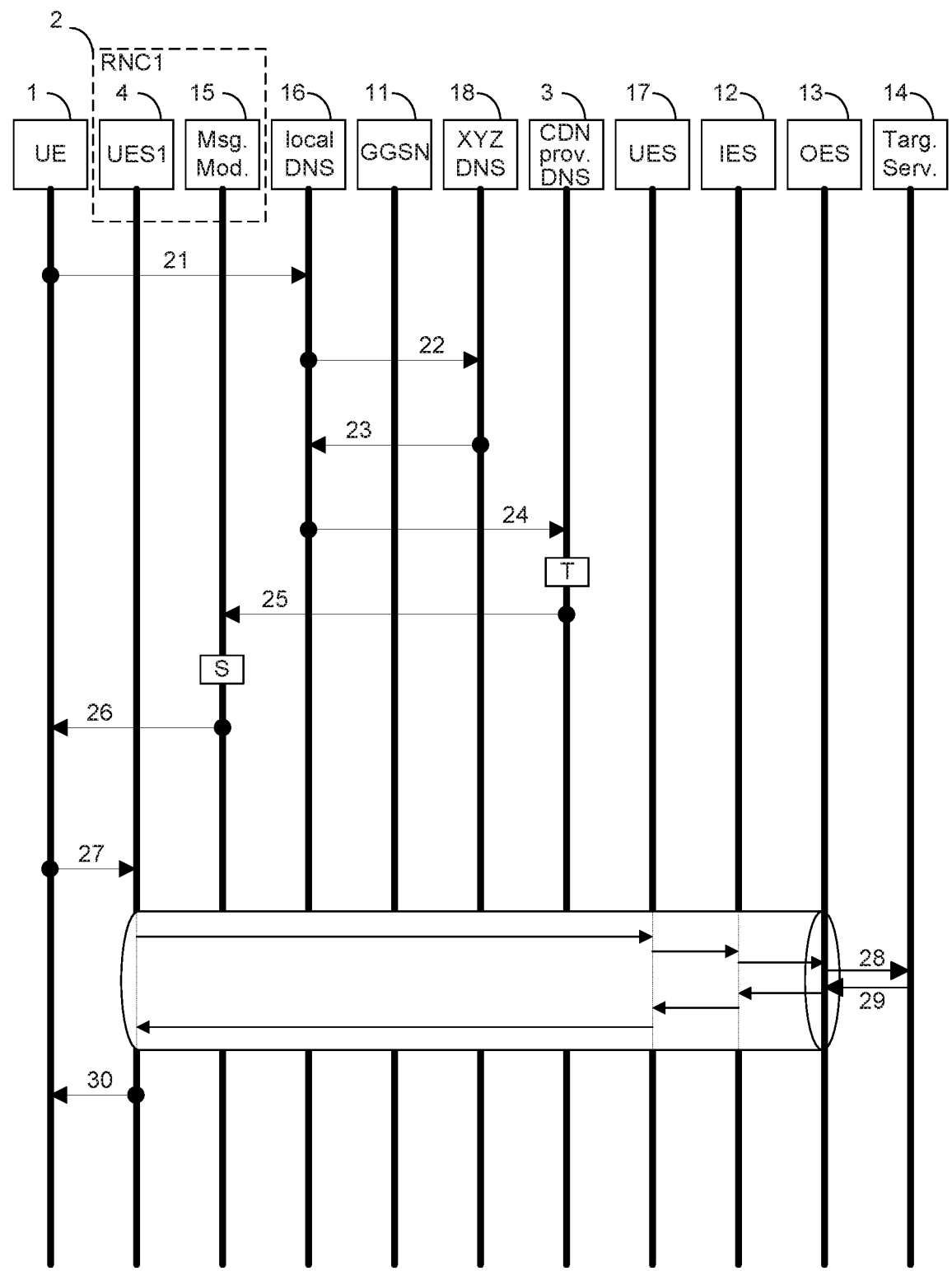
FIG. 4 discloses a signal sequence diagram of a method to find a suitable acceleration edge server in a mobile network and direct IP packets via the server.

FIG. 4 discloses a signal sequence diagram of a method according to the first embodiment of the invention to find a suitable acceleration edge server in the operator's mobile network and direct IP packets to/from the server via an acceleration tunnel. Signalling points 1,2,4,16,11,18,3,17, 12,13 and 14 included in FIG. 4 have been explained earlier together with FIG. 3a. A signalling point message modifier 15 is located within the Radio Network Controller 2 in FIG. 3a. The message modifier modifies received selected messages. The first four steps of the method that now will be explained are part of the prior art and have been explained together with FIG. 2. The method comprises the following steps:

A browser in the user device 1 sends 21 a DNS request for an URL of a provider portal. This prior art step has been explained earlier together with FIG. 2.

The local DNS queries the portal provider's DNS, i.e. the query is sent 22 from the local DNS 16 to the XYZ DNS. This prior art step has been explained earlier together with FIG. 2.

An URL pointing at the CDN provider portal is returned 23, as earlier mentioned in prior art.

The local DNS sends 24 a request to CDN provider DNS. This prior art step has been explained earlier together with FIG. 2. The selected server in this example is the user edge server 17 in the Internet network. From the perspective of the mobile network the selected server will be suboptimal as it would reside outside the mobile network.

According to the first embodiment of the invention a token is now inserted T by the CDN provider DNS, into the DNS header of a name resolution reply message 7, which token serves as an indicator to any RNC edge server on the path to be triggered. The token will function as an explicit or implicit hint which can be used by the Radio Network Controller (or eNodeB) to make a decision on substituting an IP address in the reply message against another IP address.

The reply message 7 is sent 25 from the CDN provider DNS towards the user terminal 1. The IP address 90 of the selected server 17 is hereby returned. The IP address 90 is called the virtual IP address VIP.

The message modifier 15 in the Radio Network Controller 2 intercepts the reply. If a certain criteria are met, the VIP is replaced by the IP address IP1 91 of the edge server UES1 4 associated to the Radio Network Controller RNC1 2. The criteria could be in the answer field of the reply message 7. The VIP could for example be the token and the RNC1 2 hereby checks if the VIP matches IP addresses stored in a pool of pre-provisioned source IP addresses stored in the RNC1. As an alternative the token could be in an additional field of the reply message 7. The token could then be a string, hash or number which the Radio Network Controller matches against. In case of match in any of the examples above, a preset IP address IP1 91 is inserted in a modified reply message 8.

The virtual IP VIP is stored S in the Radio Network Controller 2 for later use.

The modified reply message 8 is sent 26 from the Radio Network Controller 2 to the terminal 1.

IP packets destined towards the RNC edge server are sent 27 from the terminal 1 to the RNC user edge server (UES1) 4.

The CDN provider RNC edge server is started. It uses the prior stored VIP to create a tunnel towards the CDN providers User edge server 17. The user packets are accelerated within the tunnel by mechanisms of the CDN provider. The portal provider server, i.e. the target server, gets the packets 28 and sends back for example web pages. Packets 29 from the portal provider server are accelerated within the tunnel back to the RNC via the Internet and core network. This step will later be carefully explained together with FIG. 5.

The terminal 1 receives the packets 30.

In a second embodiment of the invention, instead of modifying the reply message 7 in the Radio Network Controller 2 as in the first embodiment, the reply message is modified in the eNodeB 19. In the second embodiment, the Virtual IP address VIP 90 is forwarded from the PDN-GW 80 to the eNodeB 19. In the second embodiment, the message modifier 15 instead is located in the eNodeB 19 and intercepts the request. If a certain criteria is met, the VIP is substituted in the reply message for an IP address IP3 92 of the edge server UES3 20 associated to the eNodeB, and forwarded to the terminal 1. The VIP is stored in the eNodeB 19 in the second embodiment. IP traffic packets sent from the terminal are in the second embodiment destined towards the eNodeB edge server and a tunnel is created from eNodeB edge server 20 towards the CDN providers User edge server 17.

Figure 5:
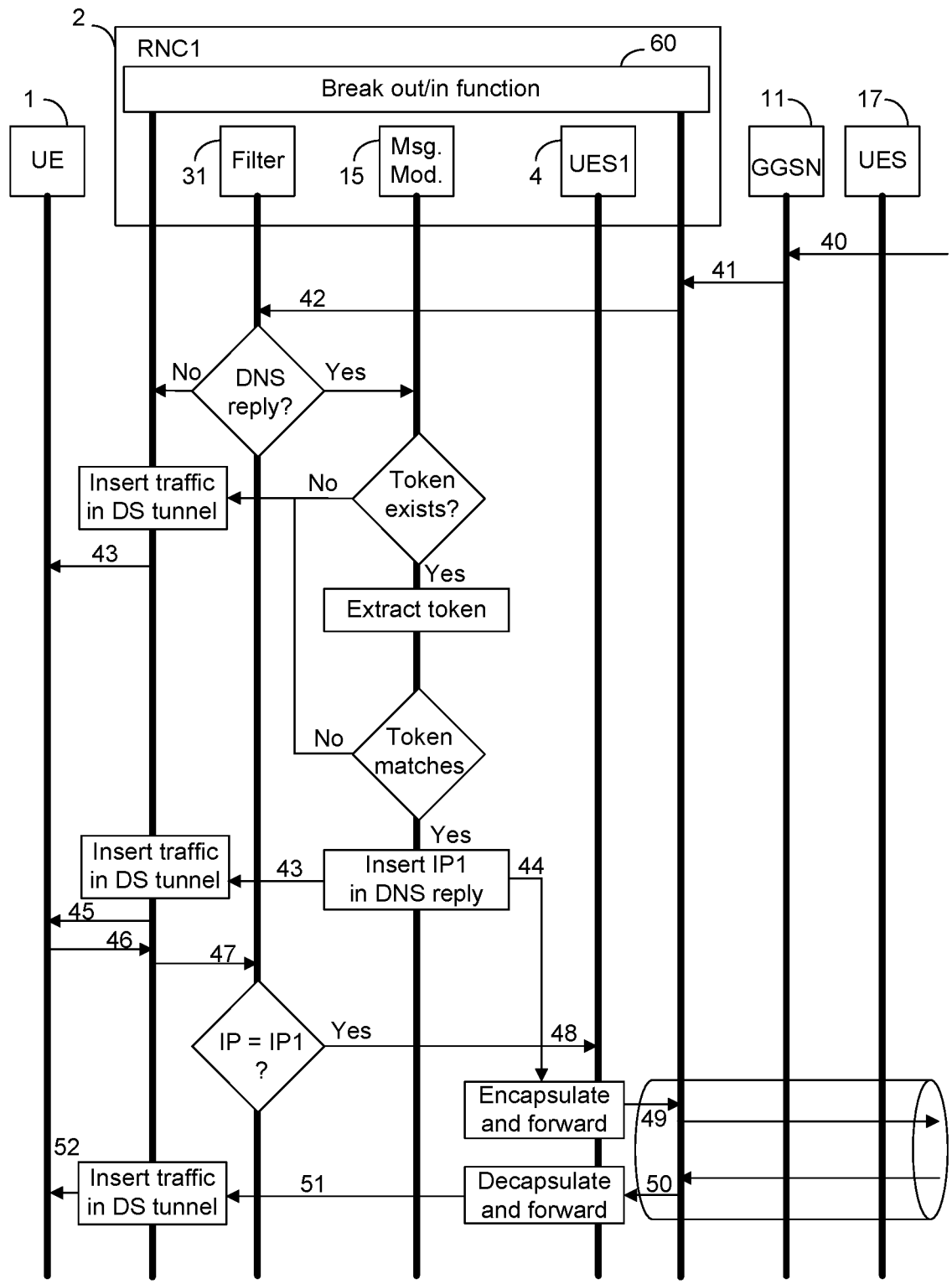
FIG. 5 discloses an algorithm of a Radio Network Controller to direct IP packets from a terminal via an acceleration edge server in a mobile network into a CDN provider acceleration tunnel and from the acceleration tunnel via a downstream tunnel to the terminal.

FIG. 5 discloses an algorithm of a Radio Network Node to direct IP packets from a terminal via an acceleration edge server in a mobile network into a CDN provider acceleration tunnel and from the acceleration tunnel via a downstream tunnel to the terminal. In FIG. 5 the Radio Network Controller 2 has been used to exemplify the algorithm but it is to be noted that the eNodeB 19 as well might be used. Signalling points 1, 2, 4, 11, 15, and 17 included in FIG. 5 have been explained earlier together with FIG. 1-4. A filter 31 is located in the Radio Network Controller 2. The main function of the filter 31 is to check if a received message is a DNS message. A break out/in function 60 handles the break out/in of tunnels. The algorithm comprises the following steps:

Traffic towards the terminal 1 is received 40,41 by the Radio Network controller 2 coming from the GGSN.

The traffic is forwarded 42 internally within the Radio Network controller 2 to the filter function 31. The filter function checks if the traffic is a DNS reply. If the traffic is a DNS reply message a new check is performed to see if a token exists, else the traffic is forwarded to the terminal 1 unchanged.

If the token existed in the reply message the token is extracted from the reply, else the traffic is forwarded to the terminal 1 unchanged through a downstream tunnel.

If the token matches the token pre-configured inside the Radio Network Controller 2, the original IP address in the reply message is the VIP and the IP address IP1 of the edge server 4 is exchanged against the VIP and inserted into the reply. The original IP address VIP is stored. An alternative implementation of the token is to extract the VIP from the reply and perform a match on a set of known VIP addresses pre-configured in the RNC for this purpose. In case of a match the IP address IP1 of the edge server 4 is exchanged against the VIP and inserted into the reply.

The traffic is inserted 43 into the downstream tunnel towards the terminal.

The traffic is tunneled 45 towards the terminal 1.

The terminal 1 sends 46,47 traffic towards the portal provider server using IP1 supplied in step 43.

Traffic is intercepted in the Radio Network Controller 2 and forwarded to the filter function 31.

If the destination IP matched the IP address IP1 of the user edge server 4, traffic is forwarded 48 to the user edge server.

The traffic is encapsulated by the user edge server 4 and sent 49 to the user edge server 17 identified by the stored VIP. The up stream traffic is accelerated over the CDN provider acceleration tunnel.

Down stream traffic is accelerated by the CDN provider acceleration tunnel. On the return path via the tunnel from the GGSN direction, the traffic hits the user edge sever 4 which decapsulates the traffic and the traffic is inserted 51 by the break out/in function 60 into a corresponding Down Stream tunnel toward the terminal.

The traffic arrives 52 at the terminal device with lower latency due to the extension of the tunnel mechanism.

Figure 6:
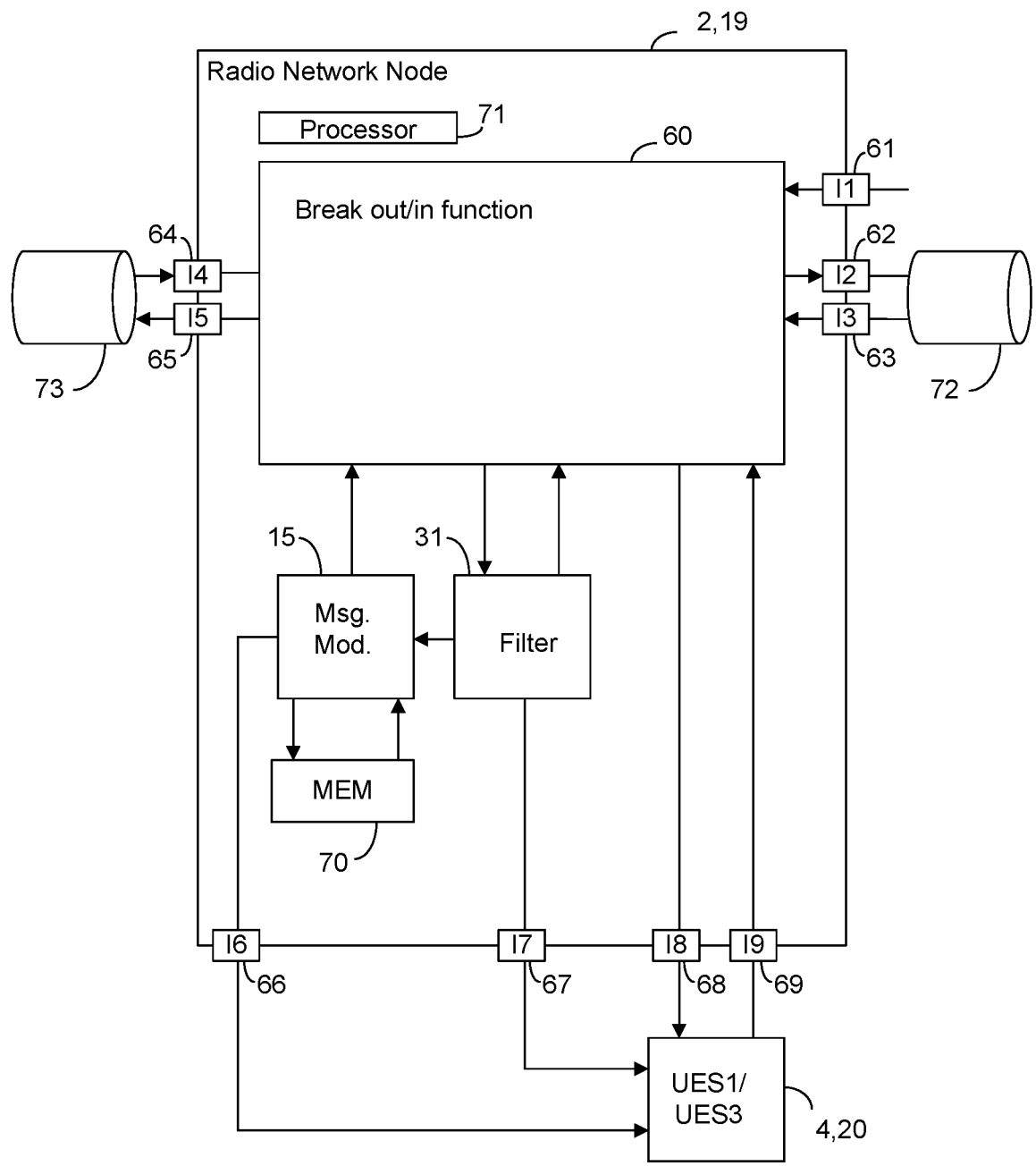
FIG. 6 discloses block schematic illustration of a Radio Network Node.

FIG. 6 discloses block schematic illustration of a Radio Network Node RNN 2,19. The RNN configuration comprises in this example the earlier mentioned Break out/in function 60, the message modifier 15 and the filter function 31. The break out/in function is attached via an interface I1 61 to the fixed network (not shown in the figure). A storage device MEM 70 is connected to the message modifier 15. The storage device may be used to store for example an Internet protocol IP address VIP of the content delivery provider server or a preset IP address of the edge server. The storage device 70 may also for example be used as a pool of stored values, against which a received token is compared. The storage device 70 may comprise one or several memory units. A processor 71 is used to control the entities within the RNN. The earlier mentioned CDN provider acceleration tunnel 72 and the downstream tunnel 73 can be seen in FIG. 6 connected via interfaces I2 62, I3 63, I4 64 and I5 65. As already mentioned, the RNN may be for example a Radio Network Controller or an evolved Node B. The earlier explained User Edge Servers UES1 4 and UES3 20 have been disclosed in FIG. 6, either one connected to the message modifier 15, the filter 31 and the break out/in function 60, via interfaces I6 66, I7 67, I8 68 and I9 69.

System and nodes that can be used to put the invention into practice is schematically shown in the figures. Enumerated items are shown in the figures as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signal embodied in one or more of a carrier wave, a computer disk (magnetic, or optical (e.g., CD or DVD, or both), non-volatile memory, tape, a system memory, and a computer hard drive.

The systems and methods of the present invention may be implemented for example on any of the Third Generation Partnership Project (3GPP), European Telecommunications Standards Institute (ETSI), American National Standards Institute (ANSI), Long Term Evolution (LTE) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer. The invention is not limited to the above described and in the drawings shown embodiments but can be modified within the scope of the enclosed claims.

The invention claimed is:

1. A method, comprising:
receiving, by an edge server located below a Gateway GPRS Support Node (GGSN) and in a mobile telecommunication network from a mobile terminal located in the mobile telecommunication network, packets having a destination Internet Protocol (IP) address of the edge server;
encapsulating, by the edge server located below the GGSN and in the mobile telecommunication network, the received packets to form encapsulated packets;
sending, by the edge server located below the GGSN and in the mobile telecommunication network to a target server located above the GGSN and outside of the mobile telecommunication network, the encapsulated packets via an acceleration tunnel, wherein the target server is a content delivery provider server,
wherein the edge server located below the GGSN and in the mobile telecommunication network is collocated with a radio network controller or an eNodeB.

2. The method of claim 1, wherein the sending of the encapsulated packets comprises:
creating a tunnel towards an edge server located in the Internet using a stored IP address.

3. The method of claim 2, wherein the edge server located in the Internet is a Content Delivery Network (CDN) user edge server.

4. The method of claim 2, wherein the edge server located in the Internet sends the encapsulated packets via the acceleration tunnel to one or more edge servers located in the Internet or in an Internet Service Provider (ISP) network.

5. The method of claim 1, wherein the target server is located in an Internet Service Provider (ISP) network.

6. The method of claim 1, further comprising:
receiving, by the edge server located below the GGSN and in the mobile telecommunication network from the target server, encapsulated data packets responsive to the encapsulated data packets sent by the edge server located below the GGSN and in the mobile telecommunication network;
decapsulating, by the edge server located below the GGSN and in the mobile telecommunication network, the responsive encapsulated data packets; and
sending the decapsulated data packets to the mobile terminal via a downstream tunnel.

7. A non-transitory computer readable medium, which when executed by a processor of an edge server located below a Gateway GPRS Support Node (GGSN) and in a mobile telecommunication network causes the processor to:
receive, by the edge server located below the GGSN and in the mobile telecommunication network from a mobile terminal located in the mobile telecommunication network, packets having a destination Internet Protocol (IP) address of the edge server;
encapsulate, by the edge server located below the GGSN and in the mobile telecommunication network, the received packets to form encapsulated packets;
send, by the edge server located below the GGSN and in the mobile telecommunication network to a target server located above the GGSN and outside of the mobile telecommunication network, the encapsulated packets via an acceleration tunnel, wherein the target server is a content delivery provider server,
wherein the edge server located below the GGSN and in the mobile telecommunication network is collocated with a radio network controller or an eNodeB.

8. The non-transitory computer readable medium of claim 7, wherein the sending of the encapsulated packets comprises:
creating a tunnel towards an edge server located in the Internet using a stored IP address.

9. The non-transitory computer readable medium of claim 8, wherein the edge server located in the Internet is a Content Delivery Network (CDN) user edge server.

10. The non-transitory computer readable medium of claim 8, wherein the edge server located in the Internet sends the encapsulated packets via the acceleration tunnel to one or more edge servers located in the Internet or in an Internet Service Provider (ISP) network.

11. The non-transitory computer readable medium of claim 7, wherein the target server is located in an Internet Service Provider (ISP) network.

12. The non-transitory computer readable medium of claim 7, further comprising:
receiving, by the edge server located below the GGSN and in the mobile telecommunication network from the target server, encapsulated data packets responsive to the encapsulated data packets sent by the edge server located below the GGSN and in a mobile telecommunication network;
decapsulating, by the edge server located below the GGSN and in the mobile telecommunication network, the responsive encapsulated data packets; and
sending the decapsulated data packets to the mobile terminal via a downstream tunnel.

* * * * *